(12) United States Patent
Nakayama et al.

(10) Patent No.: US 7,502,308 B2
(45) Date of Patent: Mar. 10, 2009

(54) OPTICAL RECORDING MEDIUM

(75) Inventors: Hiroshi Nakayama, Miyagi (JP); Atsushi Takeuchi, Miyagi (JP); Mitsuo Arima, Miyagi (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 10/741,291

(22) Filed: Dec. 19, 2003

(65) Prior Publication Data
US 2004/0208088 A1   Oct. 21, 2004

Related U.S. Application Data

(63) Continuation-in-part of application No. PCT/JP02/05837, filed on Jun. 12, 2002.

(30) Foreign Application Priority Data
Jun. 22, 2001   (JP) ............... P2001-189087

(51) Int. Cl.
*G11B 7/24* (2006.01)
(52) U.S. Cl. ............... 369/275.4; 369/275.3; 369/275.1
(58) Field of Classification Search ............... None
See application file for complete search history.

(56) References Cited

U.S. PATENT DOCUMENTS

| | | | | |
|---|---|---|---|---|
| 5,274,623 A | * | 12/1993 | Usami et al. | 369/275.1 |
| 5,293,568 A | | 3/1994 | Oshiba | |
| 5,422,874 A | * | 6/1995 | Birukawa et al. | 369/275.2 |
| 5,841,748 A | * | 11/1998 | Yamamuro | 369/47.14 |
| 5,848,050 A | * | 12/1998 | Nagasawa et al. | 369/275.4 |
| 5,892,752 A | | 4/1999 | Matsuura | |
| 5,978,327 A | | 11/1999 | Kuroda | |
| 6,373,816 B1 | * | 4/2002 | Kobayashi | 369/275.4 |
| 2002/0081459 A1 | * | 6/2002 | Tanaka | 428/694 ML |

FOREIGN PATENT DOCUMENTS

| | | |
|---|---|---|
| EP | 1202255 | 5/2002 |
| JP | 04-186530 | 7/1992 |
| JP | 04186530 | 7/1992 |
| JP | 09-106579 | 4/1997 |
| JP | 09-305977 | 11/1997 |
| JP | 2001-143319 | 5/2001 |

OTHER PUBLICATIONS

European Search Report corresponding to European Serial No. 02738659.8; Mar. 22, 2007; 5 pages.
EP Communication dated Jul. 19, 2007.

* cited by examiner

*Primary Examiner*—Joseph Feild
*Assistant Examiner*—Tawfik Goma
(74) *Attorney, Agent, or Firm*—Sonnenschein Nath & Rosenthal LLP

(57) ABSTRACT

An optical recording medium has spirally or concentrically formed tracks and capable of an optical recording. The optical recording medium includes a data recording and reproducing area divided into a plurality of zones in the radial direction. One zone is divided into a plurality of sectors respectively having an address area including pits having address information and a data are in which data is only present in grooves. The number of sectors forming each zone is different. An optical disc is formed so that an average reflectance Iadd of the address part and an average reflectance Idata of the data part satisfy a relation expressed by $0.7 \leq (Iadd/Idata) \leq 1.3$ or $0.8 \leq (Iadd/Idata) \leq 1.2$.

12 Claims, 12 Drawing Sheets

|  | MATERIAL (at%) | FILM THICKNESS (nm) |
|---|---|---|
| PROTECTIVE FILM | UV RESIN | 10 (μm) |
| REFLECTING FILM | AlTi | 40 |
| SECOND DIELECTRIC LAYER | SiN | 30 |
| MAGNETIC LAYER | TbFeCo | 30 |
| FIRST DIELECTRIC LAYER | SiN | 80 |
| SUBSTRATE | PC (POLYCARBONATE) | 1.2 (mm) |

FIG.6

|  | MATERIAL | FILM THICKNESS (nm) |
|---|---|---|
| PROTECTIVE FILM | UV RESIN | 10 (μm) |
| REFLECTING FILM | AlTi | 10 |
| SECOND DIELECTRIC LAYER | SiN | 30 |
| THIRD MAGNETIC LAYER | TbFeCo | 40 |
| SECOND MAGNETIC LAYER | GdFe | 40 |
| FIRST MAGNETIC LAYER | GdFeCo | 40 |
| FIRST DIELECTRIC LAYER | SiN | 80 |
| SUBSTRATE | PC (POLYCARBONATE) | 1.2 (mm) |

FIG.7

|  | MATERIAL (wt%) | FILM THICKNESS (nm) |
|---|---|---|
| PROTECTIVE FILM | UV RESIN | 10 (μm) |
| REFLECTING FILM | AgPdCu | 40 |
| SECOND DIELECTRIC LAYER | ZnS-SiO$_2$ | 30 |
| MAGNETIC LAYER | GeSbTe | 30 |
| FIRST DIELECTRIC LAYER | ZnS-SiO$_2$ | 80 |
| SUBSTRATE | PC (POLYCARBONATE) | 1.2 (mm) |

FIG.8

| SAMPLE NUMBER | DEPTH OF PIT |
|---|---|
| 1 | 40 nm GROOVE |
| 2 | 45 nm GROOVE |
| 3 | 45 nm GROOVE |
| 4 | 140 nm GROOVE |

OPTICAL RECORDING MEDIUM

RELATED APPLICATION DATA

The present application is a continuation-in-part of PCT application No. PCT/JP02/05837 filed Jun. 12, 2002, and claims priority to Japanese Application(s) No(s). P2001-189087 filed Jun. 22, 2001, which applications are incorporated herein by reference to the extent permitted by law.

BACKGROUND OF THE INVENTION

The present invention relates to an optical recording medium for recording and reproducing data by using a laser beam and more particularly to an optical recording medium in which an address area is intermittently arranged in a radial direction and the storage capacity of an optical disc is improved by a technique, that is, what is called a zoning method.

To increase a storage capacity by effectively using a recording area in an optical disc, a method called a zoning method has been hitherto employed. This is a method that a reference recording frequency for recording and reproducing data is switched for each radius, for instance, in a disc rotating at a constant angular velocity to have substantially the same recording density throughout all the surface of the disc.

For instance, in ISO/IEC14517 (130 mm 4×), ISO/IEC15286 (130 mm 8×), ISO/IEC15041 (90 mm 5×) or the like as magneto-optical discs of an ISO standard, the storage capacity of the disc is improved by using this method.

Figure 1:
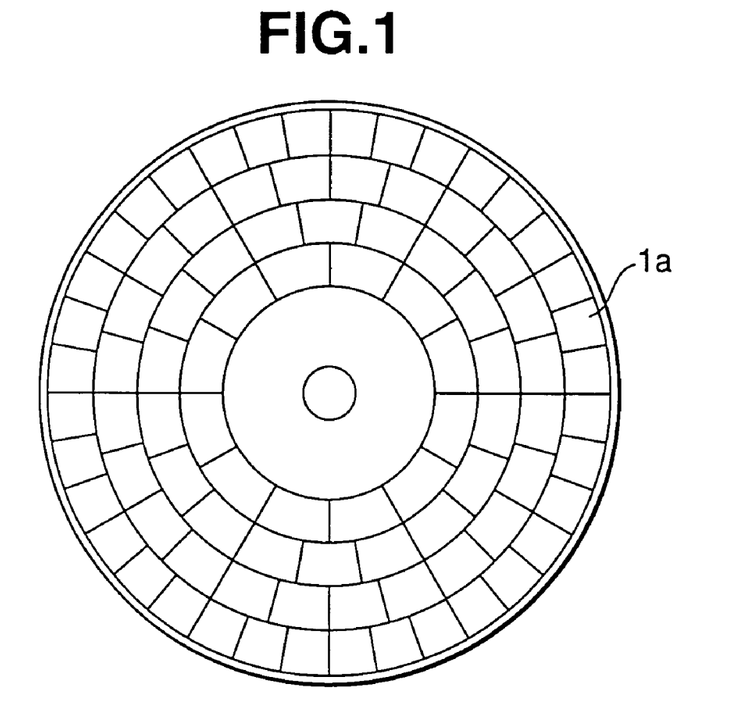
FIG. 1 is a plan view of an optical disc used in the present invention.

That is, a data recording and reproducing area is divided into a plurality of zones in the radial direction as shown in FIG. 1. Since frequencies for recording and reproducing data are respectively different in the zones, the number of sectors in one round changes. Therefore, an address area shows partly radial forms for each radius as shown by 1a.

Further, in a magneto-optical recording disc, an operation for setting the magnetizing direction of a recording film to a prescribed direction is applied to the disc before the disc is provided for a user. That is, an operation, that is, what is called a polarization is carried out that a static magnetic field larger than the coercive force of a recording layer is applied to the disc to forcedly direct the magnetizing direction of the recording layer to an erasing direction.

Ordinarily, when the recording layer to be polarized has a coercive force as low as $0.8 \times 10^6$ A·m (A·m is SI unit as a magnetic field strength), the recording layer can be polarized with a low magnetic field such as an electromagnet. However, when the recording layer having a coercive force not lower than $1.19 \times 10^6$ to $1.59 \times 10^6$ A·m is polarized, the temperature of the recording layer is raised to lower the coercive force and a low static magnetic field not higher than $0.8 \times 10^6$ A·m is applied to the recording layer to polarize the recording layer.

Further, in a phase-change type disc, an operation for crystallizing all the surface of a recording film is applied to the disc before the disc is provided to a user. That is, the temperature of the recording film is raised to prescribed temperature or higher and the recording film is gradually cooled. Thus, the disc is initialize from what is called an Ad-depo state as a crystalline and amorphous mixed state after the recording film is formed to a completely crystallized state.

In such an initializing process, the temperature of a recording film having a wide area such as several hundred tracks is raised at one time to polarize and crystallize the recording film. This method is called a bulk erase. In the bulk erase method, a semiconductor laser of 1 to 2 watt is restricted to the diameter of an elliptic beam having a major axis of 10 μm or longer in the radial direction of a disc. The rotating disc is irradiated with the laser beam by focusing only on the recording film to raise the temperature of the recording film.

Figure 2:
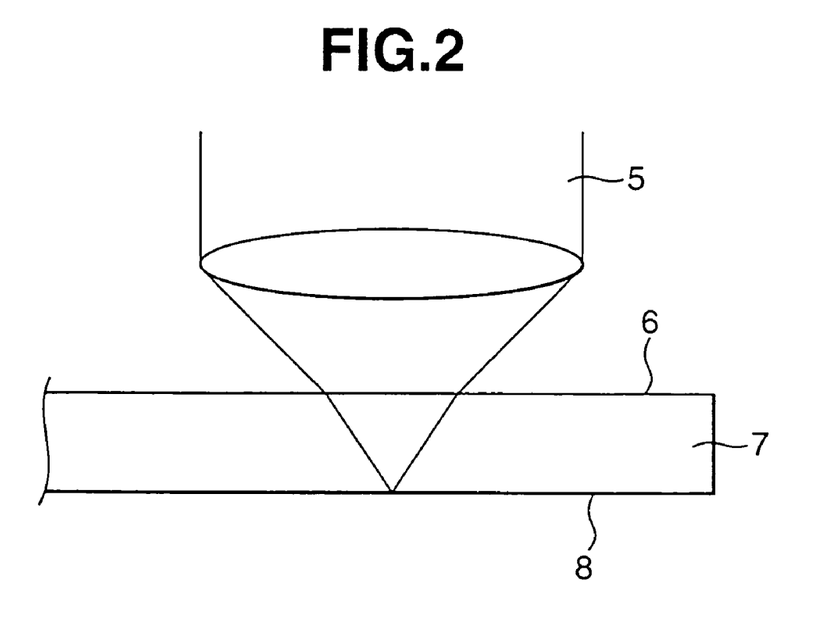
FIG. 2 is an explanatory view showing the structure of a device for performing a bulk erase process.
Figure 3A:
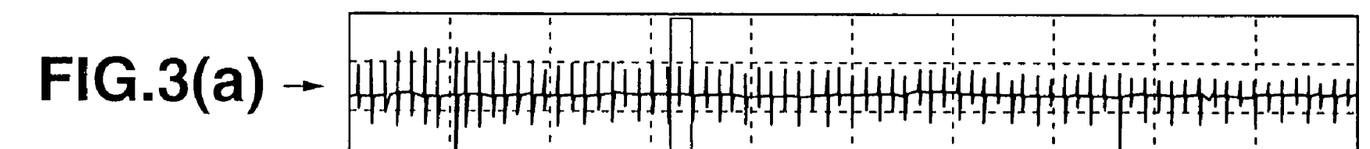
FIG. 3 is a signal wave form view showing the relation between an address signal and a tracking error signal at the position of a tenth track from the zone boundary of a disc to which a bulk erase process is entirely applied.
Figure 3B:
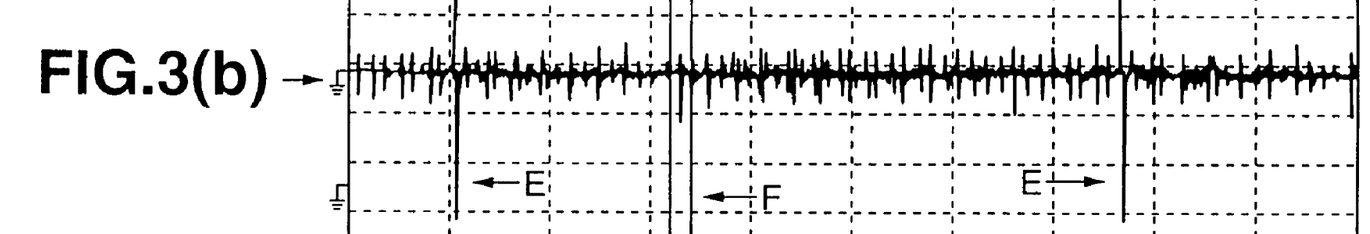
Figure 3C:
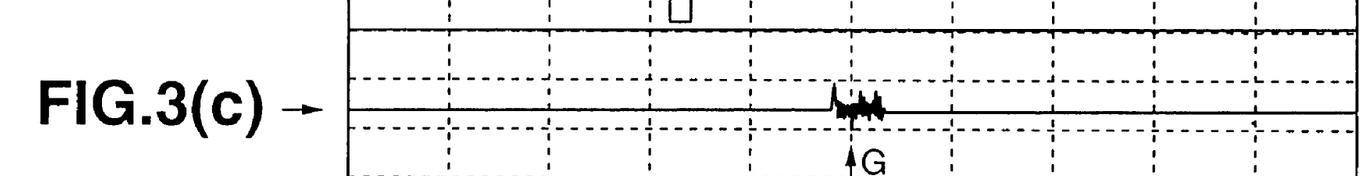
Figure 3D:
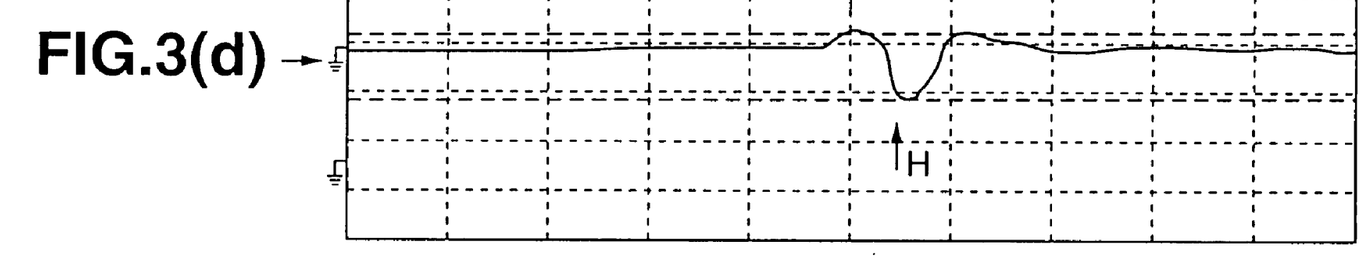

The above-described laser beam is designed, as shown in FIG. 2, to focus an output beam from a laser 5 on a recording film 8 through a resin substrate 7 from the reading surface 6 of the rotating disc.

The above-described bulk erase method has not only a purpose of initializing the recording layer, but also an effect of suppressing a sensitivity change (sensitivity shift) during the use of a medium by a user, by previously taking a recording sensitivity or a reproducing sensitivity generated upon repeated use of the medium. This operation is supposed to be carried out because thermal energy is applied to the recording film to previously relax atoms in an amorphous recording layer and stabilize the recording film.

As parameters of the bulk erase, the rotating speed or the linear velocity of a disc, a radial feed pitch of a laser spot, laser power, the width of a laser beam, etc. are enumerated. These parameters can be easily controlled, so that a polarization or an initialization and a sensitivity shift can be generated in a stable manner by setting optimum bulk erase conditions. Accordingly, the bulk erase method is a very effective method.

When the inventors of the present invention carried out a test of the bulk erase of a magneto-optical recording medium for the purpose of performing the sensitivity shift and the polarization, they found following problems. Specifically, such a bulk erase process as to sufficiently generate a prescribed sensitivity shift is applied to an optical disc zoned in the radial direction and having addresses by emboss pits set in the radial direction respectively in the zones as shown in FIG. 1. Then, they observed tracking errors in the boundaries of the zones. Thus, the existence of an area where the tracking errors were increased was recognized as shown in a signal waveform view in FIG. 3.

FIG. 3 shows a relation between an address signal and a tracking error signal in a position of a tenth track from the zone boundary of the disc whose entire surface undergoes the bulk erase process. (a) designates an address signal, (b) designates a tracking error signal, (c) designates an enlarged part of an area F of the address signal (a), and (d) designated an enlarged part of an area F of the tracking error signal (b), respectively. Further, in the drawing, E designates a track jump signal, G designates an enlarged address in the area F, and H designates a tracking error increasing part.

In measuring conditions in FIG. 3, a linear velocity of 7.5 m/s, CLV, laser power: 1.5 mW, the diameter of a disc of 86 mm, a measuring place R of 40 mm and a land part to which a tracking is applied are included.

As recognized in FIG. 3, the tracking error increasing part H in FIG. 3 is not affected by the address G and has the same positional relation as an address existing in a zone 10 tracks before the tracking error increasing part. The address separated by 10 tracks therefrom gives any effect to the tracking error.

The amount of increase of tracking errors of the tracking error increasing part H reaches as high as 17% relative to the amplitude of the track jump signal E. Further, this phenomenon is observed to spread to several hundred tracks from the zone boundary. Therefore, a drive (disc driving system) recognizes the tracking error increasing areas as defective areas and performs a replacement process. Accordingly, the disc in which an extremely many replaced sectors are present is formed.

When the bulk erase process is not performed, the above-described tracking error increasing phenomenon is not generated. However, when the bulk erase process is not performed, the recording sensitivity changes while a user uses the disc, so that optimum recording and reproducing operations cannot be performed to generate an error.

Further, a method may be proposed that a drive or the like is used to generate the sensitivity shift by a method for recording and erasing each track. However, in this method, the same track needs to be recorded and erased many times. Thus, extremely much time is necessary so that this method is not a realistic method.

SUMMARY OF THE INVENTION

It is an object of the present invention to provide an optical recording medium in which a polarization or crystallization and a prescribed sensitivity shift by a bulk erase process are performed and the increase of tracking errors in the vicinity of a zone boundary can be suppressed so that a manufacture cost is suppressed and a high quality is realized.

An optical recording medium according to the present invention has spirally or concentrically formed tracks and is capable of an optical recording. The optical recording medium comprises a data recording and reproducing area divided into a plurality of zones in the radial direction. One zone is divided into a plurality of sectors respectively having an address area including pits having address information and a data area in which the data is only present in grooves and capable of recording and reproducing data, and the number of sectors forming each zone is different. The optical recording medium wherein that an average quantity of reflecting light Iemboss of the address area and an average quantity of reflecting light Idata of the data area satisfy a relation expressed by $0.7 \leq (Iemboss/Idata) \leq 1.3$.

Further, the optical recording medium according to the present invention has spirally or concentrically formed tracks and is capable of an optical recording. The optical recording medium comprises a data recording and reproducing area divided into a plurality of zones in the radial direction. One zone is divided into a plurality of sectors respectively having an address area including pits having address information and a data in which data is only present in grooves and capable of recording and reproducing data, and the number of sectors forming each zone is different. The optical recording medium wherein that an average quantity of reflecting light Iemboss of the address area and an average quantity of reflecting light Idata of the data area satisfy a relation expressed by $0.8 \leq (Iemboss/Idata) \leq 1.2$.

Further, in the optical recording medium according to the present invention capable of recording data on both lands and grooves, the optical recording medium wherein that the groove is formed in a land track adjacent to the address area of a groove track.

Further, the optical recording medium according to the present invention wherein that the optical recording medium is manufactured by a process including a manufacturing process of irradiating a recording film with a beam having a diameter of beam larger than a track pitch to raise the temperature of the recording film.

Further, the optical recording medium according to the present invention wherein that an average quantity of reflecting light Iemboss of the address area and an average quantity of reflecting light Idata of the data area satisfy a relation expressed by $0.7 \leq (Iemboss/Idata) \leq 1.3$.

Further, the optical recording medium according to the present invention wherein that an average quantity of reflecting light Iemboss of the address area and an average quantity of reflecting light Idata of the data area satisfy a relation expressed by $0.8 \leq (Iemboss/Idata) \leq 1.2$.

Further, the optical recording medium according to the present invention wherein that the optical recording medium is manufactured by using a magneto-optical recording film.

Further, the optical recording medium according to the present invention wherein that the optical recording medium is manufactured by using a phase-change recording film.

BRIEF DESCRIPTION OF THE DRAWINGS

FIGS. 12A-B show the average reflectances in various kinds of optical discs.

FIGS. 13A-B show the curved states of tracks in various kinds of optical discs.

FIGS. 14A-B shows a format of a magneto-optical disc.

DETAILED DESCRIPTION OF THE PRESENTLY PREFERRED EMBODIMENT

Now, an embodiment of the present invention will be described by referring to the drawings. The disc format of an optical disc used in this embodiment has an address arrangement to which a method called a zoning method is applied. That is, as shown in FIG. 1, a data recording and reproducing area is divided into a plurality of zones in the radial direction. In one zone, embossed pit rows (address areas) having address information as the headers of sectors are aligned in the radial direction. At least one set or more of the address areas are alternately arranged between the adjacent zones.

In this embodiment, the arrangement of pits and grooves of address parts (address areas) was controlled so that three kinds of discs were manufactured which had the average reflectances of the address parts (Iadd) of −40%, +13% and +30% relative to the average reflectances of data parts (data areas).

As a method for controlling the average reflectance of the address part, a method that the depth of pits is changed and a method that grooves are inserted between the pits of adjacent tracks may be proposed.

Figure 4:
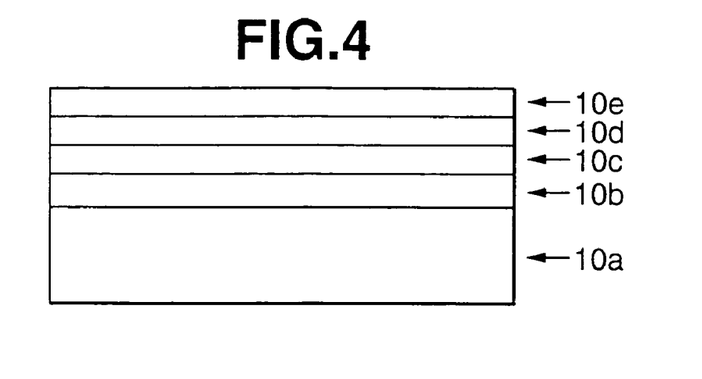
FIG. 4 is an explanatory view showing the structure of a section of the optical disc used in the present invention.

The section of an optical disc used in this embodiment is shown in, for instance, FIG. 4. On a resin substrate 10a having the address arrangement shown in FIG. 1, a protective layer 10b, a recording layer 10c, a protective layer 10d and a reflecting layer 10e are sequentially laminated and formed by a sputtering method. The recording layer 10c may be made of a magnetic film having magneto-optical characteristics or a phase-change film showing crystalline-amorphous characteristics. Further, the recording layer 10c may have a multi-layer structure. The reflecting layer 10e may be covered with a film of an ultraviolet curing resin or the like. The resin substrate 10a may be covered with a transparent protective film.

Figure 5:
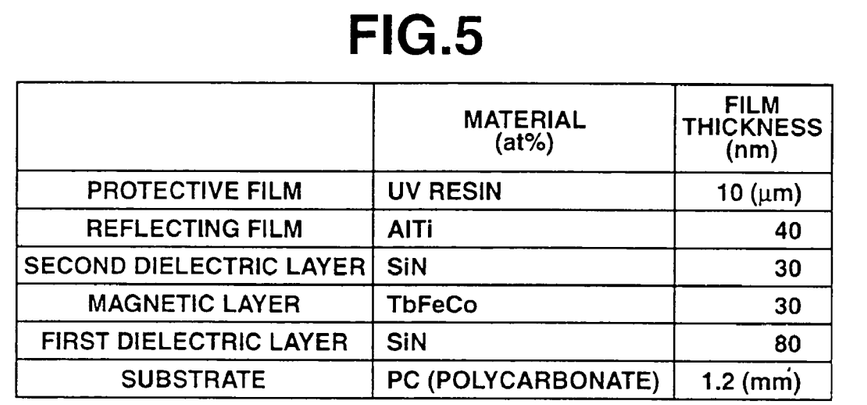
FIG. 5 is a table showing the structure of a section of the optical disc having a magnetic film including a single layer used in the present invention.

The structure of a section of an optical disc in which a recording layer is a single layer made of a magnetic film is shown in, for instance, a table of FIG. 5. Further, the structure of a section of an optical disc in which a recording layer having multi-layers and made of a magnetic film is shown in, for instance, a table of FIG. 6. Further, the structure of a section of an optical disc in which a recording layer is made of a phase-change film is shown in, for instance, a table of FIG. 7.

A bulk erase process was carried out relative to these sample discs in such a manner that an elliptic beam which had the wave length of a light source of 810 nm, a diameter on a recording surface of 200 μm in the radial direction of the disc, and 1 μm in the circumference direction was moved by 20 μm in the radial direction by the rotation of one round under the power of 1000 mW and the linear velocity of 7.5 m/s.

Subsequently, a tracking process was applied to a position of a tenth track in the outer peripheral direction from a zone boundary by using a disc reproducing device having wave length (λ) of 660 nm and the numerical aperture (NA) of an objective lens of 0.57 to measure a tracking error signal, that is, a push-pull signal.

As a result, it was recognized that, in the sample having the average reflectance of the address part of −40%, a tracking error changed by 20% relative to values from a bottom to a peak of a track jump signal, and the track was curved in the inner peripheral direction judging from a polarity of the tracking error.

Further, it was recognized that, in the sample of the average reflectance of the address part of +30%, a remaining tracking error was 15% and the track was curved in the outer peripheral direction.

Further, it was recognized that, in the sample of the average reflectance of the address part of +13%, a remaining tracking error was 7% and the track was curved in the outer peripheral direction in the same way as that of the sample having the average reflectance of the address part of +30%.

It is to be recognized that the remaining tracking error is zero at these positions before the bulk erase process is carried out.

As apparent from these facts, when the reflectance of the address part is lower than the reflectance of the data part, the tracks located in the outer periphery of the address are expected to curve in the inner peripheral direction. When the former is higher than the latter, the tracks are expected to curve in the outer peripheral direction. When the reflectances are the same, the tracks are expected not to curve.

Consequently, it was recognized that, in order to reduce the left tracking error due to the bulk erase process, the average reflectance of the address area was preferably near to the average reflectance of the groove area (the data areain which data is only present in grooves).

Now, more specific examples, various kinds of substrates were used as samples and a bulk erase process was applied thereto in the same manner as described above. Then, tracking errors were measured when a tracking process was applied to positions of prescribed tracks in the outer peripheral direction from zone boundaries in the same manner as described above.

Figure 8:
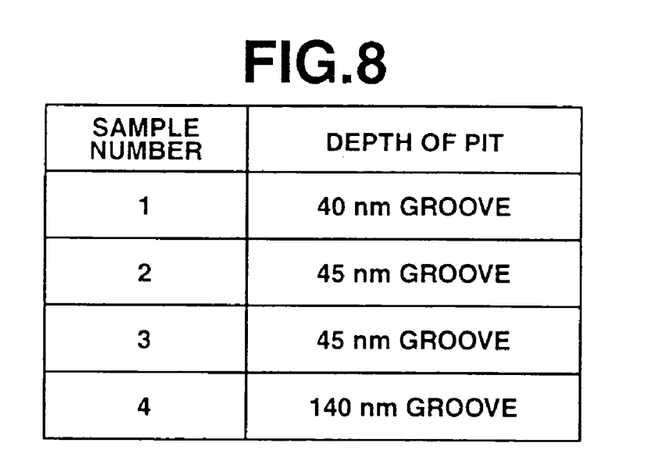
FIG. 8 is a table showing the contents of various kinds of substrate samples used in the present invention.

The contents of the samples at that time are shown in the table of FIG. 8.

In this case, conditions of the bulk erase include 800 mW, CLV 7.5 m/s and 10 μm/rot, and the bulk erase is carried out four times. Conditions of tester include λ=640 nm, NA=0.575, D/W=0.677 (⊥)·0/614 (∥)

Figure 9:
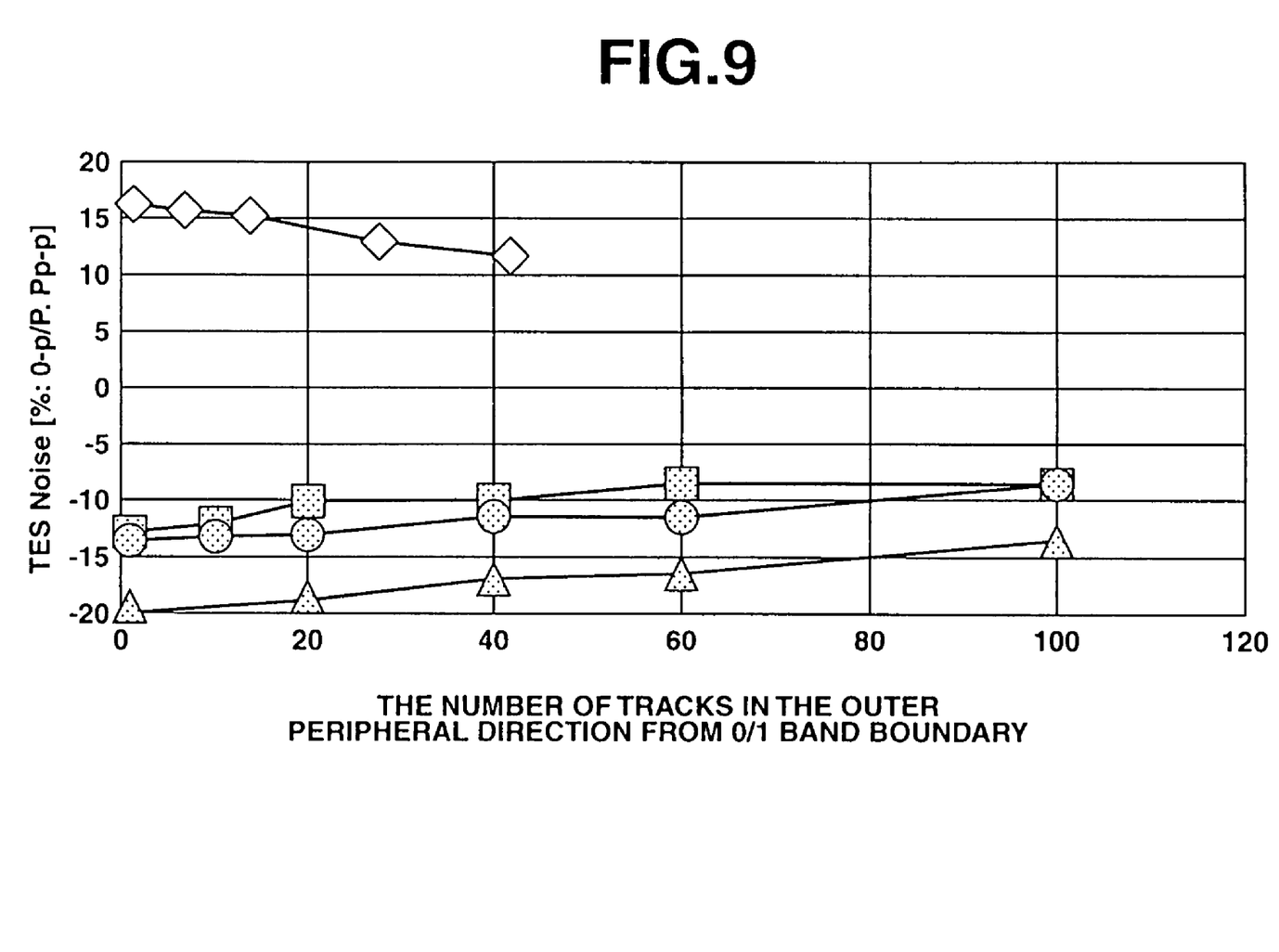
FIG. 9 is an explanatory view showing the number of tracks in the outer peripheral direction from the 0/1 band boundary of the TES noise in the optical disc using various kinds of substrate.
Figure 10:
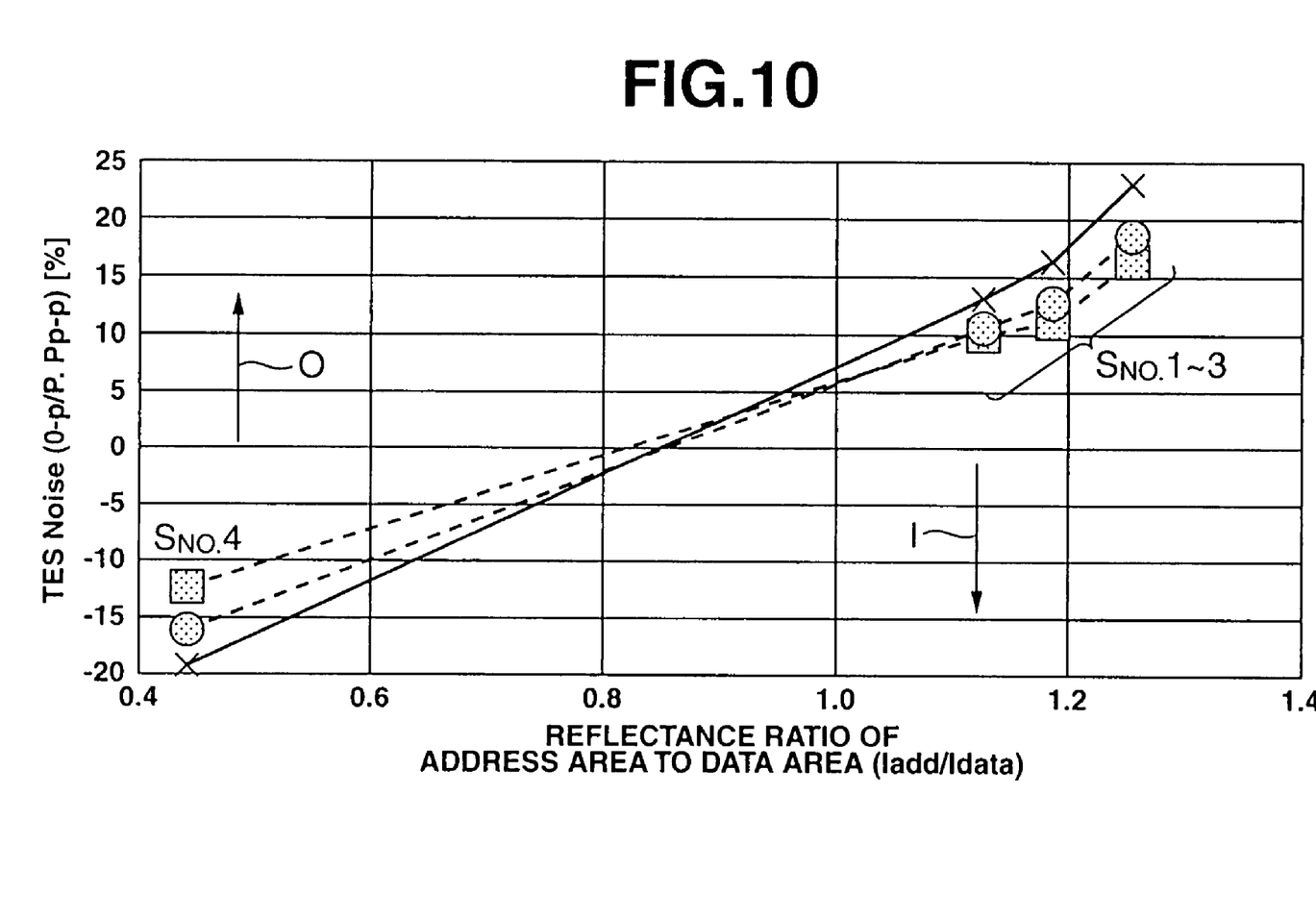
FIG. 10 is a characteristic view showing the relation between the TES noise and the reflectance ratio of addresses to a data area in the optical disc.
Figure 11:
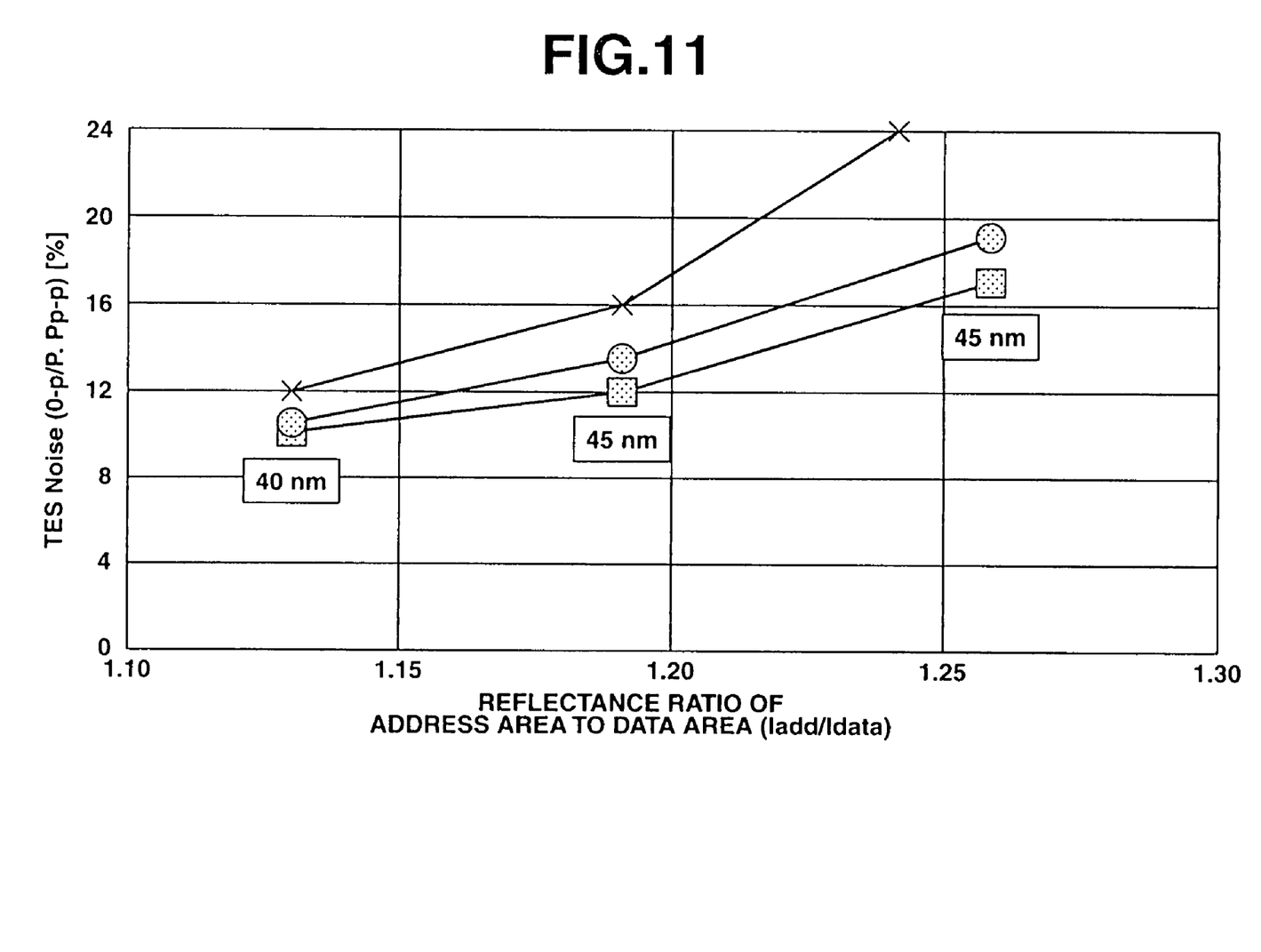
FIG. 11 is a characteristic view showing the relation between the TES noise and the reflectance ratio of the addresses to the data area in the optical disc in which a part of FIG. 10 is enlarged.

The states of noise (it is abbreviated as TES noise, hereinafter) from the addresses of the tracking error signals as the results measured based on the samples of the Table of FIG. 8 and the measuring conditions are shown in FIGS. 9 to 11. FIG. 9 shows TES noise in each track position for each sample substrate. FIG. 10 shows the TES noise relative to a ratio (Iadd/Idata) of the average reflectance Iadd of the address part to the average reflectance Idata) of the data part. FIG. 11 is an enlarged view of the sample numbers 1 to 3 in FIG. 10, specifically, shows the TES noise relative to the ratio of the reflectances of the substrates of the sample numbers 1 to 3 in the Table of FIG. 8.

FIG. 9 shows a dependence of the TES noise on the address average reflectance. Numbers of tracks on an x-axis count a land and a groove respectively as one. Further, a square mark in FIG. 9 indicates a sample number 1, a circular mark indicates a sample number 2, a triangular mark indicates a sample number 3, and a rhombic mark indicates a sample number 4, respectively.

Further, an arrow mark O shown in FIG. 10 indicates a shift in the outer peripheral direction and an arrow mark I indicates a shift in the inner peripheral direction. A circular mark indicates data of a 20th track. A square mark indicates data of a 40th track. $S_{NO}$ 1 to 3 show sample numbers 1 to 3. $S_{NO}$ 4 shows a sample number 4.

In $S_{NO}$ 1 to 3 shown in FIG. 10, the circular mark and the square mark in the left side indicate a sample number 1 (that is, a disc in which the average reflectance of the address part is +13% relative to the average reflectance of the data part). The circular mark and the square mark in the central part indicate a sample number 2 (that is, a disc in which the average reflectance of the address part is +19% relative to the average reflectance of the data part). The circular mark and the square mark in the right side indicate a sample number 3 (that is, a disc in which the average reflectance of the address part is +25% relative to the average reflectance of the data part).

A cross mark (x) on a graph shown by a solid line shows the data of a sample substrate in which a recording layer is made of a phase-change film.

A circular mark in FIG. 11 shows a 20th track and a square mark shows a 40th track. Further, "40 nm" and "45 nm" respectively indicate the depth of a groove.

As apparent from FIGS. 9 to 11, the TES noise increases when the difference between the average reflectance of the address part and the average reflectance of the data part is large. When the ratio of both the average reflectance comes near to 1, the TES noise becomes small. There is no direct relation (indirect relation exists) between the depth of the groove and the quantity of TES noise. Further, the polarity of the TES noise depends on the difference in degree of the reflectance between the address part and the data part (In the substrates of the sample numbers 1 to 3, the reflectance of the address part is larger than that of the data part. In the substrate of the sample number 4, the reflectance of the address part is smaller than that of the data part).

Thus, in this embodiment, the optical disc is formed so that the relation between the average reflectance Iadd of the address part and the average reflectance Idata of the data part satisfy a relation expressed by $0.7 \leq (\text{Iadd}/\text{Idata}) \leq 1.3$ or more preferably, a relation expressed by $0.8 \leq (\text{Iadd}/\text{Idata}) \leq 1.2$.

Figure 6:
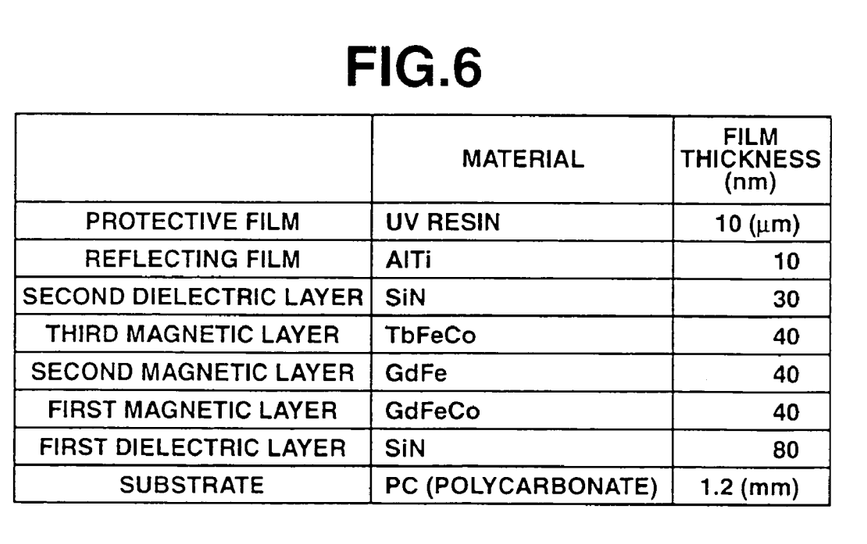
FIG. 6 is a table showing the structure of a section of the optical disc having a magnetic film including multi-layers used in the present invention.
Figure 7:
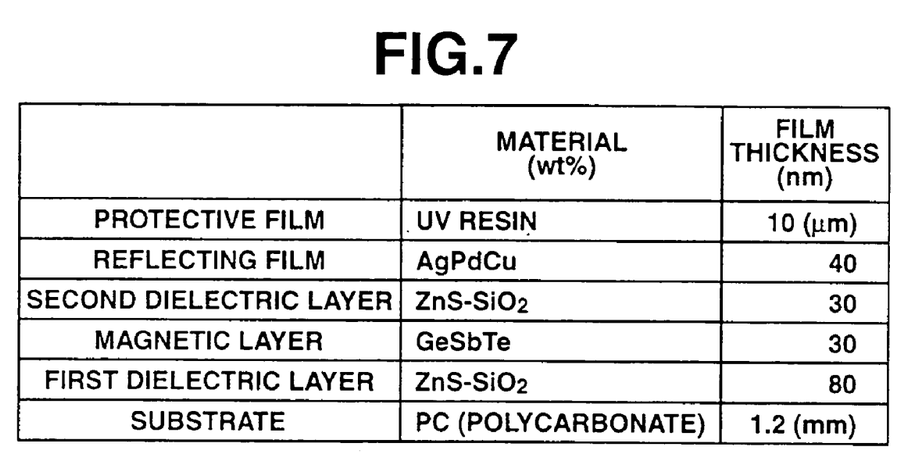
FIG. 7 is a table showing the structure of a section of the optical disc having a phase-change film used in the present invention.

As the data of the TES noise relative to the ratio of reflectances shown in FIGS. 10 and 11, the same results were obtained respectively for the discs having the structures shown in the Tables of FIGS. 5 to 7.

In the substrates of the sample numbers 1 to 3 shown in the Table of FIG. 8, it was recognized that the TES noise was resulted from the address parts of even sectors (refer them to as E sectors, hereinafter) as shown in FIGS. 12 and 13.

Figure 12A:
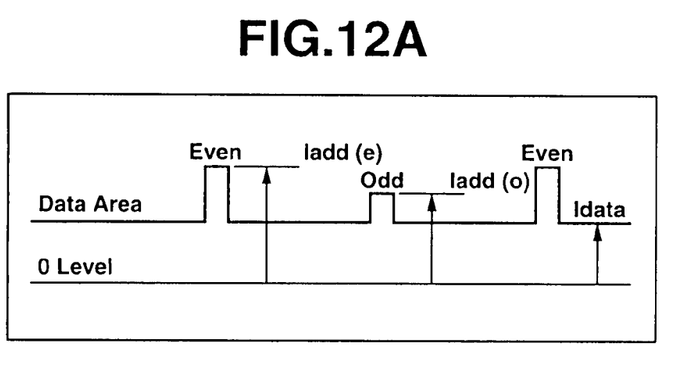
FIG. 12A is a signal waveform view showing the average reflectances in the substrates of sample numbers 1 to 3.
Figure 12B:
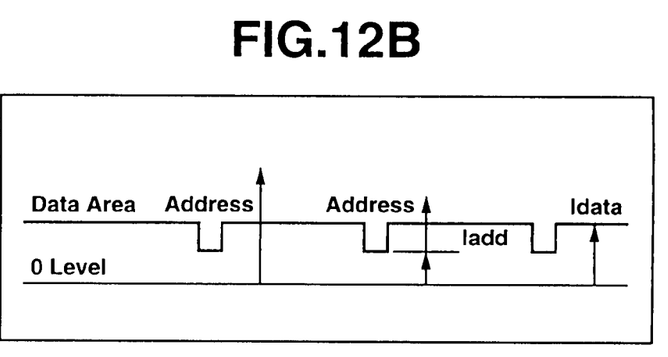
FIG. 12B is a signal waveform view showing the average reflectance in the substrate of a sample number 4.

FIG. 12A shows the average reflectance in the substrates of the sample numbers 1 to 3 (the average reflectance of the address part is high). FIG. 12B shows the average reflectance in the substrate of the sample number 4 (the average reflectance of the address part is low).

The average reflectance shown in FIG. 12 is obtained by measuring the reflectance of a bulk eraser by a monitor signal.

Figure 13A:
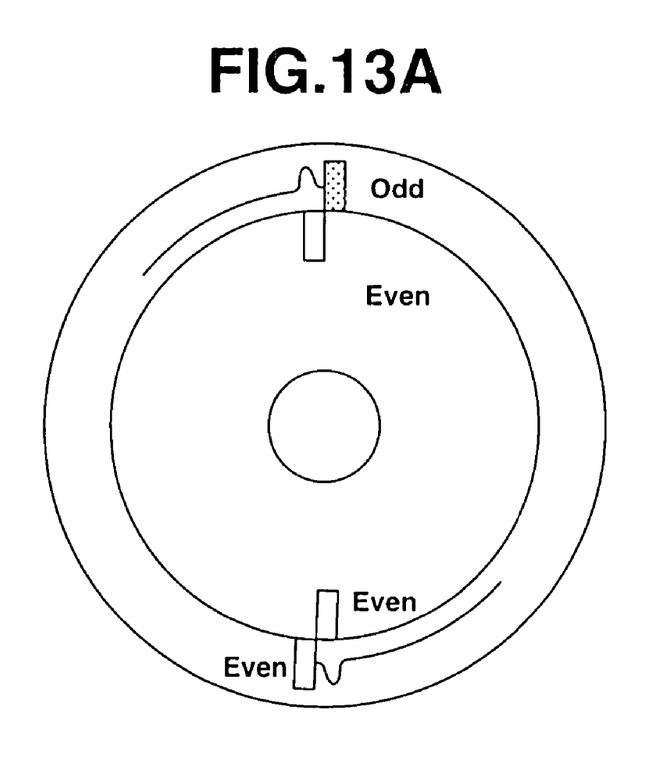
FIG. 13A is a plan view of the substrates of sample numbers 1 to 3.
Figure 13B:
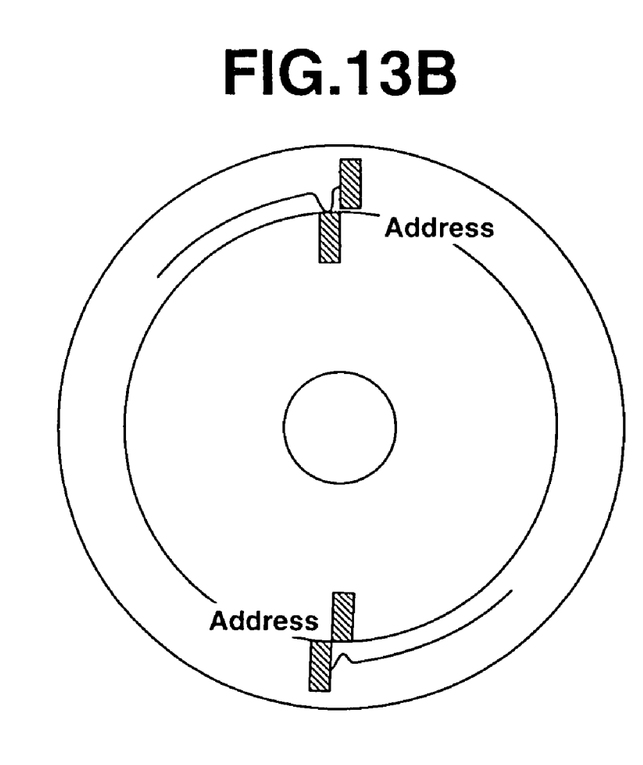
FIG. 13B is a plan view of the substrate of a sample number 4.

Further, FIG. 13A shows a state that the track is bent to an outer periphery in the substrates of the sample numbers 1 to 3. FIG. 13B shows a state that the track is bent to an inner periphery in the substrate of the sample number 4.

As apparent from FIG. 12A, the average reflectance Iadd (e) of the address part of the E sector is higher than the average reflectance Iadd (o) of the address part of an odd sector (refer it to as an O sector, hereinafter). Thus, the difference between the average reflectance Idata of the data part and the average reflectance of the address part is very large.

As described above, the TES noise is caused by the address part of the E sector having the high reflectance. For overcoming this problem, for instance, a method for reducing the thickness of a resist may be proposed, however, this method is not good because a cross-talk tends to be increased.

Figure 14A:
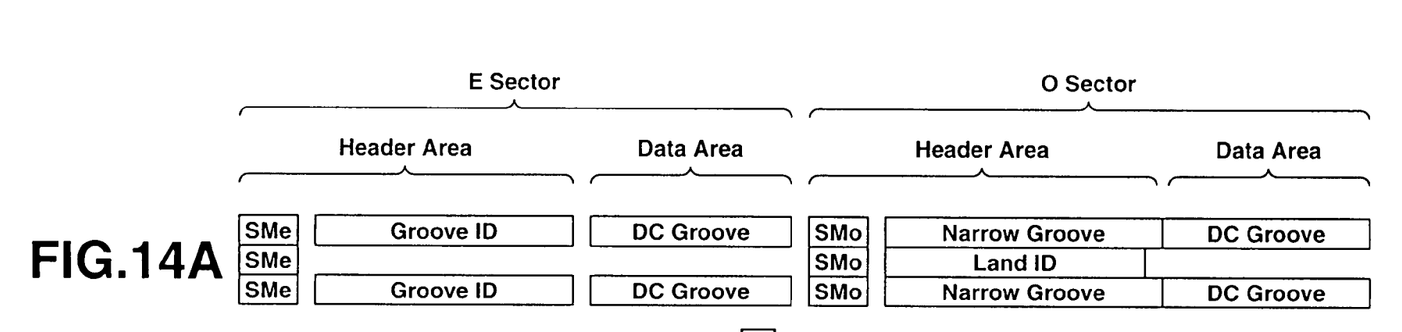
FIG. 14A is an explanatory view showing a conventional format.
Figure 14B:
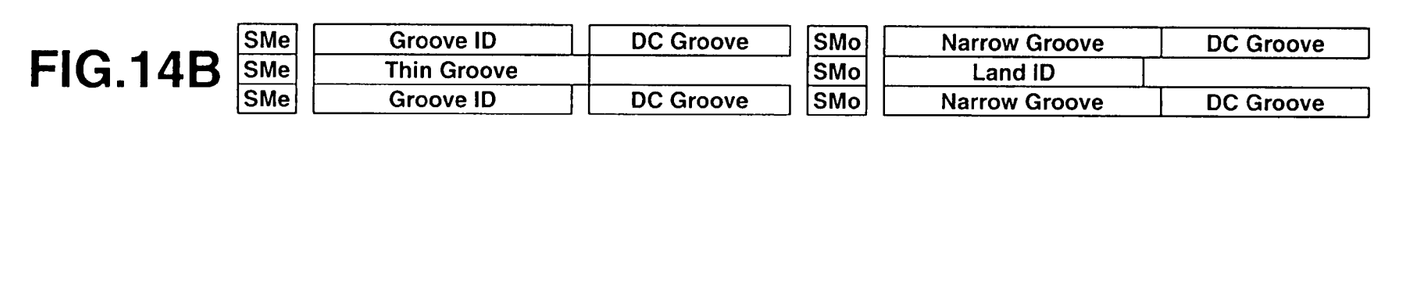
FIG. 14B is an explanatory view showing a format to which the present invention is applied.

As another embodiment of the present invention, a part of a format is changed in an optical disc as shown in FIG. 14. FIG. 14A shows the present format and FIG. 14B shows the format of this embodiment in which a countermeasure for the TES noise is performed.

That is, a thin groove is formed in a land track (mirror part) between two groove tracks in the address part of an E sector as shown in FIG. 14B.

Figure 15:
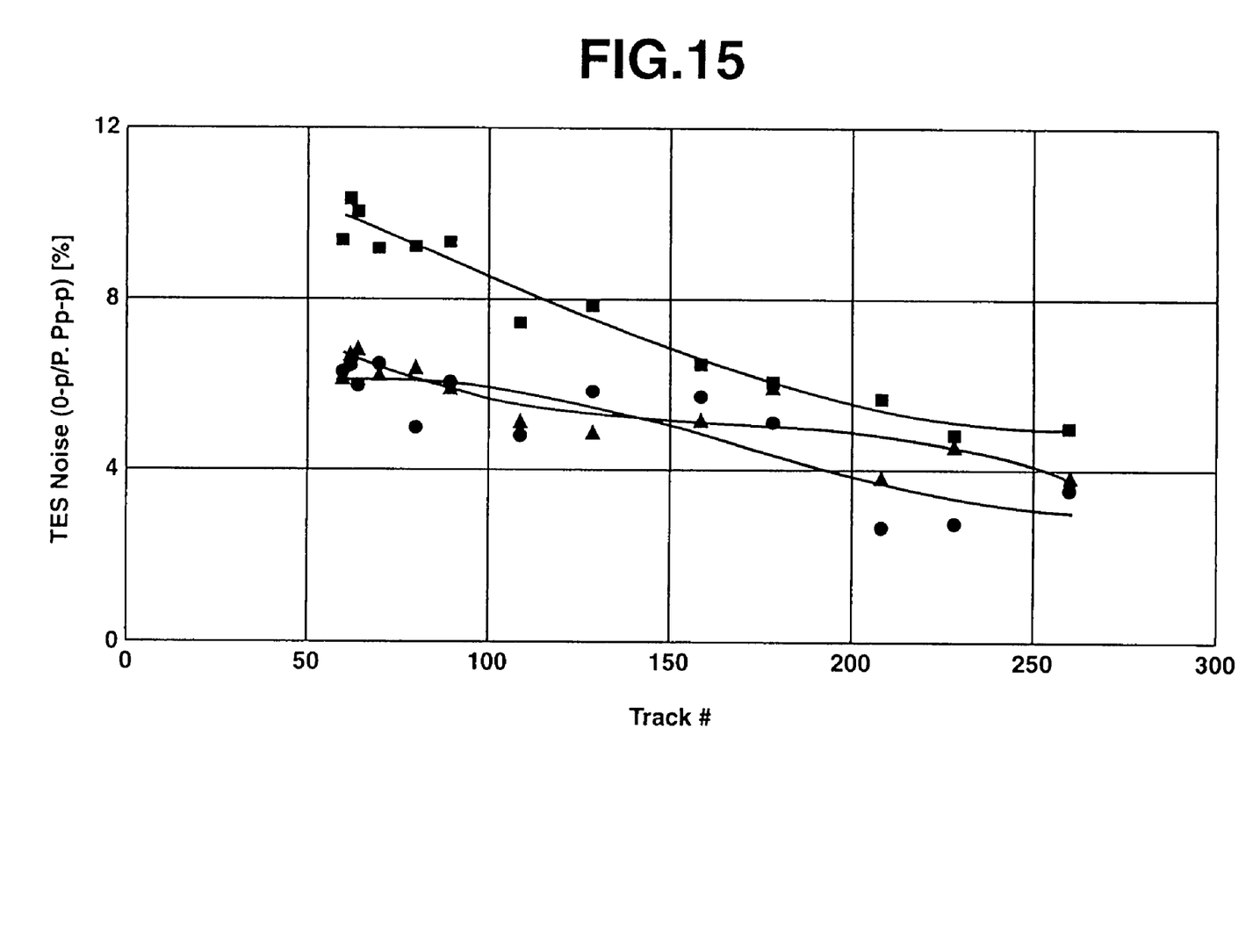
FIG. 15 is a characteristic view showing the TES noise of the optical disc according to an embodiment of the present invention.

FIG. 15 shows results obtained by measuring the TES noise respectively at each track position in the same measuring method as described above when the thin groove is formed.

In FIG. 15, a square mark shows the data of a disc (G1-1104) in which the thin groove is not formed (Tp=0.65). A circular mark shows the data of a disc (G1-1118) in which the thin groove is formed (Tp=0.65). A triangular mark shows the data of a disc (G1-1117) in which the thin groove is formed (Tp=0.67). Bulk erase conditions of each disc in FIG. 15 include LD power of 800 mW, CLV 7.5 m/s and 10 μm/rot, and the bulk erase is carried out four times.

As apparent from FIG. 15, the TES noise of the disc in which the thin groove is formed is extremely lower than that in which the thin groove is not formed.

In the above-described embodiment, the optical disc is formed so that the relation between the average reflectance Iadd of the address part and the average reflectance Idata of the data part satisfy a relation expressed by $0.7 \leq (\text{Iadd}/\text{Idata}) \leq 1.3$ or more preferably, a relation expressed by $0.8 \leq (\text{Iadd}/\text{Idata}) \leq 1.2$. However, the optical disc of the present invention may be formed so that an average quantity of reflecting light Iemboss of the address area and an average quantity of reflecting light Idata of the data area satisfy a relation expressed by $0.7 \leq (\text{Iemboss}/\text{Idata}) \leq 1.3$ or are located within a range satisfying a relation expressed by $0.8 \leq (\text{Iemboss}/\text{Idata}) \leq 1.2$.

As described above, according to the present invention, the ratio of the average quantity of reflecting light of the address area of the optical recording medium (that is, for instance, the average reflectance of the address part) to the average quantity of reflecting light of the data area (that is, for instance, the average reflectance of the data part) is controlled, so that the optical recording medium having little tracking error left can be manufactured.

Accordingly, the simultaneous polarization, the simultaneous sensitivity shift and the simultaneous crystallization in the set tracks can be realized. Thus, an initializing time can be reduced.

Further, a bulk erase process in which power is more improved can be carried out so that a bulk erase time can be furthermore reduced.

INDUSTRIAL APPLICABILITY

The optical recording medium of the present invention may be formed by using a magneto-optical recording film or a phase-change recording film.

The optical recording medium of the present invention is not limited to a circular form like an optical disc and its outline may be a non-circular form. That is, for instance, the outer periphery of the optical disc may be cut in a straight line or an elliptic form.

Figure 16:
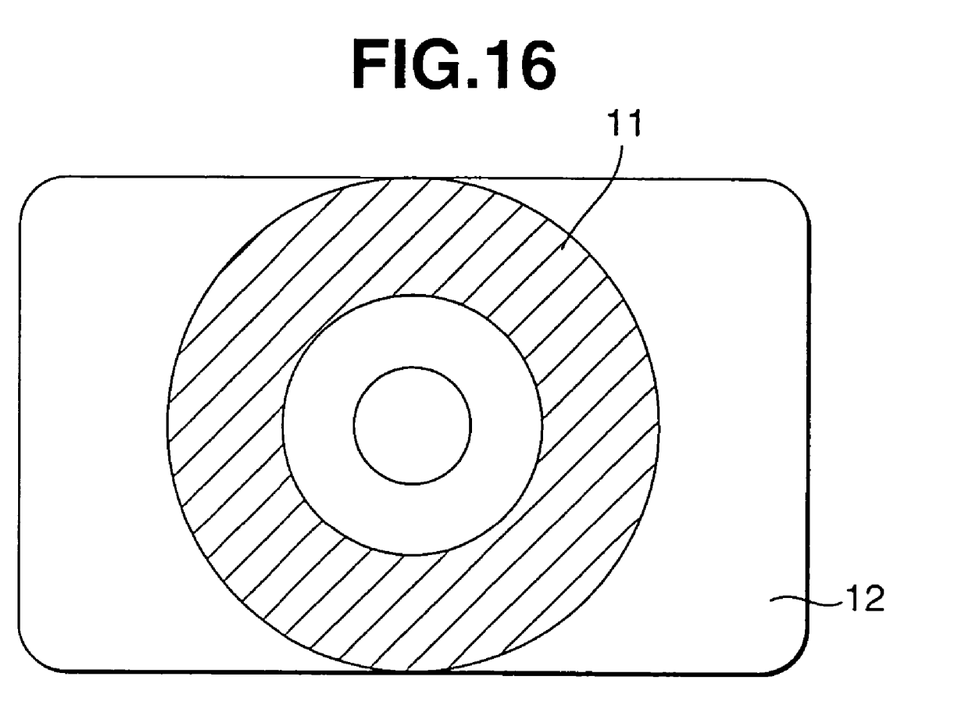
FIG. 16 is a plan view showing another embodiment of the present invention.

In the optical recording medium of the present invention, a data recording and reproducing area (optical recording and reproducing area) 11 may be incorporated in a card main body 12 of a postcard size or a business card size as shown in FIG. 16.

What is claimed is:

1. An optical recording medium having spirally or concentrically formed tracks defined by lands and grooves and capable of an optical recording, the optical recording medium comprising a data recording and reproducing area divided into a plurality of zones in the radial direction, one zone being divided into a plurality of sectors respectively having an address area including pits having address information and a data area in which data is only present in the grooves and configured for recording and reproducing of data, and the number of sectors forming each zone being different,
   wherein,
   the address area includes an extra groove within a land in which the address data is present; and an average quantity of reflecting light Iemboss of the address area and an average quantity of reflecting light Idata of the data area satisfy a relation expressed by $0.7 \leq (\text{Iemboss}/\text{Idata}) \leq 1.3$ due to the presence and configuation of the extra groove in the address area and the presence of the address data within the extra groove.

2. An optical recording medium having spirally or concentrically formed tracks defined by lands and grooves and capable of an optical recording, the optical recording medium comprising a data recording and reproducing area divided into a plurality of zones in the radial direction, one zone being divided into a plurality of sectors respectively having an address area including pits having address information and a data area in which data is only present in the grooves and configured for recording and reproducing of data, and the number of sectors forming each zone being different, wherein, the address area includes an extra groove within a land in which the address data is present; and an average quantity of reflecting light Iemboss of the address area and an average quantity of reflecting light Idata of the data area satisfy a relation expressed by $0.8 \leq (\text{Iemboss}/\text{Idata}) \leq 1.2$ due to the presence and configuration of the extra groove in the address area and the presence of the address data within the extra groove.

3. The optical recording medium according to claim 1, wherein the optical recording medium is manufactured by a process including a manufacturing process of irradiating a recording film with a beam having a diameter of beam larger than a track pitch to raise the temperature of the recording film.

4. The optical recording medium according to claim 2, wherein the optical recording medium is manufactured by a process including a manufacturing process of irradiating a recording film with a beam having a diameter of beam larger than a track pitch to raise the temperature of the recording film.

5. The optical recording medium according to claim 1 or claim 2, wherein the optical recording medium is manufactured by a process including a manufacturing process of irradiating a recording film with a beam having a diameter of beam larger than a track pitch to raise the temperature of the recording film.

6. The optical recording medium according to claim 1, wherein an average quantity of reflecting light Iemboss of the address area and an average quantity of reflecting light Idata of the data area satisfy a relation expressed by $0.8 \leq (\text{Iemboss}/\text{Idata}) \leq 1.2$.

7. The optical recording medium according to claim 1, wherein the optical recording medium comprises a magneto-optical recording film.

8. The optical recording medium according to claim 2, wherein the optical recording medium comprises a magneto-optical recording film.

9. The optical recording medium according to claim 6, wherein the optical recording medium comprises a magneto-optical recording film.

10. The optical recording medium according to claim 1, wherein the optical recording medium comprises a phase-change recording film.

11. The optical recording medium according to claim 2, wherein the optical recording medium comprises a phase-change recording film.

12. The optical recording medium according to claim 6, wherein the optical recording medium comprises a phase-change recording film.

* * * * *